(12) United States Patent
Lundh et al.

(10) Patent No.: US 12,721,305 B2
(45) Date of Patent: Sep. 1, 2026

(54) MILKING INSTALLATION AND METHOD FOR MILKING

(71) Applicant: DELAVAL HOLDING AB, Tumba (SE)

(72) Inventors: Andrés Lundh, Tumba (SE); Johan Ter Weele, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 18/719,187

(22) PCT Filed: Dec. 16, 2022

(86) PCT No.: PCT/SE2022/051192
§ 371 (c)(1),
(2) Date: Jun. 12, 2024

(87) PCT Pub. No.: WO2023/113687
PCT Pub. Date: Jun. 22, 2023

(65) Prior Publication Data

US 2025/0064015 A1 Feb. 27, 2025

(30) Foreign Application Priority Data

Dec. 17, 2021 (SE) .................................... 2151552-3

(51) Int. Cl.
*A01K 1/12* (2006.01)
*A01J 5/017* (2006.01)
*A01K 1/00* (2006.01)

(52) U.S. Cl.
CPC .............. *A01K 1/12* (2013.01); *A01K 1/0023* (2013.01); *A01J 5/017* (2013.01)

(58) Field of Classification Search
CPC .......... A01K 1/0023; A01K 1/12; A01J 5/017
See application file for complete search history.

(56) References Cited

U.S. PATENT DOCUMENTS 5,782,199 A 7/1998 Oosterling
8,171,881 B2 5/2012 Van Hoven
(Continued)

FOREIGN PATENT DOCUMENTS

EP 3214923 A1 9/2017
WO 03030629 A1 4/2003
(Continued)

OTHER PUBLICATIONS

International Search Report for PCT/SE2022/051192, mailed Mar. 21, 2023, 4 pages.
(Continued)

*Primary Examiner* — Joshua D Huson
*Assistant Examiner* — Edgar Reyes
(74) *Attorney, Agent, or Firm* — NIXON & VANDERHYE

(57) ABSTRACT

The disclosure concerns a milking installation configured to milk a group of animals, the milking installation including an entrance area, a number of milking positions configured to milk one animal at a time, a selection gate, at least one milking stall, and an exit path. The entrance area is configured to receive therein the group of animals. An entry of each milking position of the number of milking positions is arranged with direct access from the entrance area. The selection gate is accessible from an exit of each milking position. The selection gate is configured to direct one or more individual animals from the group of animals either to the at least one milking stall or to the exit path.

15 Claims, 4 Drawing Sheets

(56) References Cited

U.S. PATENT DOCUMENTS

| | | | | |
|---|---|---|---|---|
| 8,281,742 | B2 | 10/2012 | Waterlander | |
| 2004/0261723 | A1 * | 12/2004 | Birk | A01J 5/007 119/14.02 |
| 2008/0282985 | A1 * | 11/2008 | Schulte | A01K 1/12 119/14.08 |
| 2010/0116211 | A1 * | 5/2010 | Sundborger | A01J 5/007 119/14.08 |
| 2010/0170446 | A1 | 7/2010 | Manneke et al. | |
| 2010/0180824 | A1 * | 7/2010 | Bright | A01K 29/00 119/14.08 |
| 2014/0311412 | A1 | 10/2014 | Hempenius et al. | |
| 2017/0086422 | A1 * | 3/2017 | Schomaker | A01K 1/0023 |
| 2018/0153132 | A1 * | 6/2018 | Palmqvist | A01K 11/006 |
| 2022/0061260 | A1 * | 3/2022 | Gross | A01K 1/0023 |

FOREIGN PATENT DOCUMENTS

| | | | |
|---|---|---|---|
| WO | 2008003341 | A1 | 1/2008 |
| WO | 2011000774 | A2 | 1/2011 |
| WO | 2012005673 | A1 | 1/2012 |
| WO | 2016071459 | A1 | 5/2016 |
| WO | 2018008026 | A1 | 1/2018 |

OTHER PUBLICATIONS

Written Opinion of the ISA for PCT/SE2022/051192, mailed Mar. 21, 2023, 6 pages.

Swedish Search Report for SE Application No. 2151552-3, dated Aug. 29, 2022, 3 pages.

* cited by examiner

MILKING INSTALLATION AND METHOD FOR MILKING

CROSS-REFERENCE TO RELATED APPLICATIONS

This application is the U.S. national phase of International Application No. PCT/SE2022/051192 filed Dec. 16, 2022, which designated the U.S. and claims priority to SE 2151552-3 filed Dec. 17, 2021, the entire contents of each of which are hereby incorporated by reference.

TECHNICAL FIELD

The invention relates to a milking installation configured to milk a group of animals. The invention also relates to a method for milking of a group of animals in a milking installation.

BACKGROUND

Animals, such as cows, may be milked in a milking installation comprising several milking positions for individual milking of an animal. At each milking position there is provided milking equipment for drawing milk from the teats of an animal. Typically, the animals are admitted to the milking installation in groups. The milking positions may be stationary or may be provided on a platform which is rotated such that animals can enter respective milking positions at an entrance location and be milked whilst being conveyed around on the platform to an exit location where the milked animals can leave the platform.

Also known is a milking installation including at least one automatic milking system, AMS, i.e., a system wherein animals are milked fully automatically without any direct human supervision of the milking process. Animals can on a voluntary basis enter a milking position of the AMS, have teat cups automatically attached to their teats e.g., by a robot arm, and be milked. Feedstuff may be supplied to the animal in the AMS e.g., to lure the animal into the AMS and the milking position. An AMS may provide an efficient manner of milking a suitably sized group of animals.

However, it has been found that animal behaviour e.g., due to herd hierarchy and pecking order within a group of animals and the time spent for animals to reach or to be brought to a milking position can sometimes interfere with efficient operation of the milking installation and reduce its capacity in terms of the number of milkings achieved per day. Therefore, a milking installation where milking is performed on a fully voluntary basis may not be optimal in every instance.

WO 2008/003341 discloses a milking installation that includes a rotary platform for transporting animals to fully automated milking stalls. The animals are allowed to board the rotating platform at a loading zone and to disembark the platform at an available milking stall under the control of gates located around the platform.

EP 3214923 discloses a device for automatically milking fluid from udders of animals of a herd of cows in a time-specifiable manner. The device contains a plurality of milking robots arranged on a base for automatically milking animals, wherein each milking robot has an inlet and an outlet and a milking cluster that can be automatically attached to the udder of an animal. The device further comprises a fenced waiting area located upstream of the inlets of the milking robots for the animals of a herd to be milked. The waiting area has an entrance for manually delivering the animals to the waiting area. The device has an animal driver unit for automatically herding animals located in the waiting area to the inlets of respective milking robots that are becoming available.

Thus, solutions are known, which are aimed at utilising a number of milking positions in an efficient manner.

SUMMARY

The handling of animals in groups does not exclude that certain animal individuals within a group may require attention and/or special handling of their milk.

The inventors have realised that in a milking installation configured to milk a group of animals, which milking installation comprises a number of milking positions, providing the same functionality in each milking position is a waste of recourses and moreover, costly. Further, the inventors have realised that in a milking installation configured to milk a group of animals, not the same functionality has to be provided at each milking position if provisions are made for handling exceptional animal individuals within the group.

Accordingly, it is an object of the invention to provide a milking installation configured to handle a group of animals as one group while ensuring that certain animal individuals within the group and/or their milk are handled differently than the animals and/or the milk of the remaining animals within the group.

To address this object, a milking installation having the features defined in claim 1 is provided.

According to an aspect of the invention, the object is achieved by a milking installation configured to milk a group of animals. The milking installation comprises an entrance area, a number of milking positions configured to milk one animal at a time, a selection gate, at least one milking stall, and an exit path. The entrance area is configured to receive therein the group of animals. An entry of each milking position of the number of milking positions is arranged with direct access from the entrance area. The selection gate is accessible from an exit of each milking position. The selection gate is configured to direct one or more individual animals from the group of animals either to the at least one milking stall or to the exit path.

Since the selection gate is accessible from the exit of each milking position and since the selection gate is configured to direct one or more individual animals from the group of animals either to the at least one milking stall or to the exit path, the milking installation is configured for animal individuals coming from the respective milking positions to be directed to the at least one milking stall or to the exit path.

Accordingly, the milking installation provides for certain animal individuals within the group to pass a milking position without being milked therein and at the selection gate be directed to the at least one milking stall in order to be milked therein instead. Further, the milking installation provides for animals within the group of animals that are milked in the milking positions to be directed to the exit path at the selection gate.

As a result, the milking installation is configured for milking all animals of a group of animals and the above mentioned object is achieved.

The milking installation renders it straightforward to handle the group of animals and to tend to certain animal individuals within the group. The group of animals is brough to the entrance area and from there the animals proceed to be milked, either at the milking positions or in the at least one milking stall. As mentioned above, the milking installation enables milking of all animals within a group of animals.

The milking installation may be a milking installation arranged in a farm building or underneath a protective roofing structure e.g., in connection with a pasture area.

The milking installation is configured to milk one group of animals at a time. In this context a group of animals may be formed by animals living together as a constellation over a longer period of time. A farm may keep its animals in a number of such groups. Each group is kept together and handled as one entity e.g., during feeding, milking, etc. Changes may be made in the constellation of the group by adding and/or subtracting one or a few animal individuals.

The animals are milk producing animals such as cows, sheep, or goats. The milking positions are configured to milk the particular kind of animal. For instance, each milking position comprises a relevant number of teat cups for the particular kind of animal.

Each milking position of the number of milking positions is configured to milk one animal at a time. Accordingly, each milking position comprises at least two teat cups, a vacuum connection for supplying vacuum to the teat cups, and at least one milk conduit for conducting milk from the milking position.

Each milking position has an entry and an exit. As mentioned above, the entry is arranged with direct access from the entrance area and the selection gate is accessible from the exit. Accordingly, an animal leaving the entrance area enters a milking position via the entry of the milking position and the animal leaves the milking position via the exit of the milking position to proceed to the selection gate.

The at least one milking stall is also configured to milk one animal at a time and suitably comprises at least two teat cups, a vacuum connection for supplying vacuum to the teat cups, and at least one milk conduit for conducting milk from the milking stall. The milking stall further comprises equipment that is not present at any of the milking positions. For instance, the at least one milking stall may comprise one or more of a milk sensor, a local milk receiver, animal treatment equipment, dedicated control equipment, and/or other equipment to be utilised in the handling and milking of animals, analysing milk, conducting milking, and directing milk to different containers, etc.

The entrance area is configured to temporarily house a group of animals prior to being milked. Accordingly, the entrance area does not include any animal feeding facility or any resting stalls.

The entrance area is an area wherefrom the animals of a group of animals is intended to enter the milking positions. The only way for the animals within the entrance area to leave the entrance area may be via the milking positions.

Each animal of the group of animals may enter the milking positions voluntarily from the entrance area.

The entrance area may be an enclosed area with a dedicated entrance e.g., in the form of one or more gates or one-way gates. During transfer of a group of animals into the entrance area, two or more animals may enter the entrance area simultaneously.

An animal leaving a milking position can only do so in a direction towards the selection gate. Accordingly, it is not possible for an animal in a milking position to therefrom re-enter the entrance area.

As mentioned above, each milking position is arranged with direct access from the entrance area. Herein, the term "direct access" means that an animal leaving the entrance area will be able to enter an unoccupied milking position without deviation or interruption. That is, the animal leaving the entrance area will either immediately set foot in the unoccupied milking position or an unobstructed passageway will lead the animal to the unoccupied milking position. Such an unobstructed passageway only leads to one milking position of the number of milking positions.

The milking positions of the number of milking positions may be arranged along one or more sides of the entrance area.

The selection gate is a gate configured to direct an animal in one direction out of at least two available directions. In the present case, the selection gate is configured to direct an animal towards either the at least one milking stall or the exit path. Optionally, the selection gate may be configured to direct an animal in one or more additional directions.

The exit path is a pathway configured to direct animals away from the milking installation, such as back to an area wherein the group of animals stays between milkings e.g. to feed and/or to rest. The area may be entirely or partially inside a building or in a pasture.

An exit of the at least one milking stall may lead to the exit path. Accordingly, animals leaving the at least one milking stall may again join the group of animals when leaving the milking installation.

The milking installation may be utilised for performing a method according to any one of aspects and/or embodiments discussed herein.

According to embodiments, the milking installation may comprise an animal identification device arranged at each milking position and an animal identification device arranged at the selection gate. In this manner, the identities of animals in the milking positions may be established in order to base a decision on whether a relevant animal individual is to be milked in the milking position based on its identity. Similarly, based on an established identity of an animal individual, the animal individual may be directed either to the exit path or to the at least one milking stall.

Accordingly, the milking installation may be configured for an animal individual that has been milked in one of the milking positions to be directed to the exit path at the selection gate and an animal individual that has passed un-milked through one of the milking positions to be directed to the at least one milking stall.

The animal identification devices may form part of a control arrangement.

According to embodiments, the milking installation may comprise a control arrangement configured, based on animal ID, either to retain within a first milking position of the number of milking positions an animal individual having entered the first milking position or to provide free passage through the first milking position for the animal individual to proceed to the selection gate. In this manner, the milking installation may be configured for animal individuals that are to be milked at a milking position to be retained in a relevant milking position while animal individuals that have passed un-milked through one of the milking positions to pass the milking positions without being retained or being milked therein. This may be achieved without human intervention.

According to embodiments, the control arrangement may be configured, based on individual animal ID, to control the selection gate to direct one or more animal individuals from the group of animals either to the at least one milking stall or to the exit path. In this manner, the milking installation may be configured for animal individuals that have passed un-milked through one of the milking positions to be directed to the at least one milking stall to be milked therein and animal individuals that have been milked at a milking position to be directed to the exit path. Again, this may be achieved without human intervention.

According to embodiments, the milking installation may comprise at least one robot arm configured to attach teat cups to the teats of an animal, wherein the at least one robot arm may be associated with at least one milking position of the number of milking positions and/or associated with the at least one milking stall. In this manner, the milking installation may be automated for the purpose of attaching teat cups to the teats of the animals of the group of animals.

One robot arm may be associated with each milking position and configured to attach teat cups to each animal entering the relevant milking position. Alternatively, one robot arm may be associated with two adjacent milking positions and configured to attached teat cups to each animal entering the relevant milking position. If the robot arm is occupied with attaching teat cups in one milking position, an animal entering the other milking position has to wait before the teat cups are attached to its teats.

Similarly, one robot arm may be associated with one milking stall of the at least one milking stall and configured to attach teat cups to each animal entering the one milking stall. Alternatively, one robot arm may be associated with two adjacent milking stalls or with one milking stall and one adjacent milking position.

The robot arm may be configured to assist in further animal related tasks, such as teat cleaning and teat disinfecting.

According to embodiments, the entrance area may be configured for the group of animals to move freely therein. In this manner, the individual animals within the group of animals may move freely within the entrance area e.g., in order to enter milking positions as they become available at different portions of the entrance area and/or for animals within the group to avoid one another. The latter may be the case for low ranked animals within the group of animals. Namely, within a group of animals such as cows, a strict hierarchy exists.

It may also be noted that the free movement of the animals within the entrance area in combination with each milking position being arranged with direct access from the entrance area entails that lower ranked animals within the group have a fair chance of finding an available milking position without being hindered by higher ranked animals of the group.

According to embodiments, each of the milking positions may comprise a first set of equipment and the at least one milking stall may comprise a second set of equipment. The first set of equipment is different from the second set of equipment. In this manner, animals in the milking positions and/or the milk milked from animals in the milking positions may be handled differently than animals and/or the milk milked from animals in the at least one milking stall. For instance, milk extracted from animal individuals at the milking positions may be processed in accordance with a different scheme than milk extracted from animal individuals in the at least one milking stall.

According to embodiments, the milking installation may comprise a common milk receiver for milk milked in at least two of the milking positions. The first set of equipment may comprise teat cups and milk conduits and may be connected to the common milk receiver. The first set of equipment may be configured to, during milking of one animal individual, conduct milk from the one animal individual via the milk conduits to the common milk receiver. The second set of equipment may comprise teat cups, milk conduits and a local milk receiver for temporary storage of milk milked from one animal individual only. In this manner, milk milked from animals utilising the first set of equipment at the milking positions may be directed to the common milk receiver and milk from animal individuals that is not suited for consumption, or milk from animal individuals where it is not certain whether the milk is suited for consumption, may instead be temporarily stored in the local milk receiver utilising the second set of equipment in the at least one milking stall.

The milk in the common milk receiver may be further transport to a common storage of milk intended for consumption or for further processing with the aim of being consumed, hereinafter referred to as milk for consumption. Commonly, this forms the main part of all milk from the group of animals.

The milk in the local milk receiver may be sent to the common milk storage e.g., if milk analysis verifies that the milk is suited for consumption, or to a separate milk storage, or may be disposed of. The two latter options may apply if the milk is not suited for consumption.

It has been realised by the inventors that by providing first and second sets of equipment at the milking positions and the at least one milking stall, respectively, a cost-efficient milking installation may be provided that is able not only to extract milk for consumption but to also to handle milk not suited for consumption and/or to cater for animal individuals that require special handling.

Namely, no special functionality other than milk extraction may be required from the first set of equipment in the milking positions where animal individuals producing milk for consumption are milked. Since most animals produce such milk, the milking positions may be equipped with the first set of equipment. Animals producing milk not suited for consumption, or animals where is uncertain whether their milk is suited for consumption, are not milked in the milking positions but instead directed via the selection gate to the at least one milking stall. The second set of equipment at the at least one milking stall is devised for locally storing milk from one animal individual. Accordingly, the milk may be collected locally e.g., while being analysed. The locally collected milk may be diverted to a separate storage, or be disposed of, or if analysis shows that the milk is suited for consumption, sent to the common milk storage.

Naturally, some additional functionality beside milk extraction may be provided by the first set of equipment, if so desired. For instance, basic milk testing using e.g. milk conductivity measurement may be provided by the first set of equipment. However, the second set of equipment may provide additional or different functionality, such as e.g. more advanced milk analysis using reagents.

According to some embodiments, also the first set of equipment may comprise a local milk receiver. In such embodiments, animals may be directed to the at least one milking stall to be milked with the second set of equipment e.g., for the purpose of performing milk analysis.

It is a further object of the invention to provide a method for milking a group of animals configured to handle the group as one group while ensuring that certain animal individuals within the group and/or their milk are handled differently than the animals and/or the milk of the remaining animals within the group.

To address the further object, a method having the features defined in one of the independent claims is provided.

According to an aspect of the invention, the further object is achieved by a method for milking of a group of animals in a milking installation, the method comprising steps of:

receiving the group of animals in an entrance area, providing access to a number of milking positions directly from the entrance area, milking a first animal individual of the group of animals in one milking position of the number of milking positions, directing the first animal individual via a selection gate to an exit path from the milking installation, passing a second animal individual un-milked through one milking position of the number of milking positions, directing the second animal individual via the selection gate to at least one milking stall, and milking the second animal individual in the at least one milking stall.

Since the first animal individual is milked in one of the milking positions and is directed via the selection gate to the exit path, and since the second animal individual is passed un-milked through one of the milking positions, is directed via the selection gate to at least one milking stall, and is milked therein, the first and second animal individuals may be handled differently in the milking position and the at least one milking stall, respectively. As a result, the above-mentioned object is achieved.

The method may be performed in a milking installation as discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
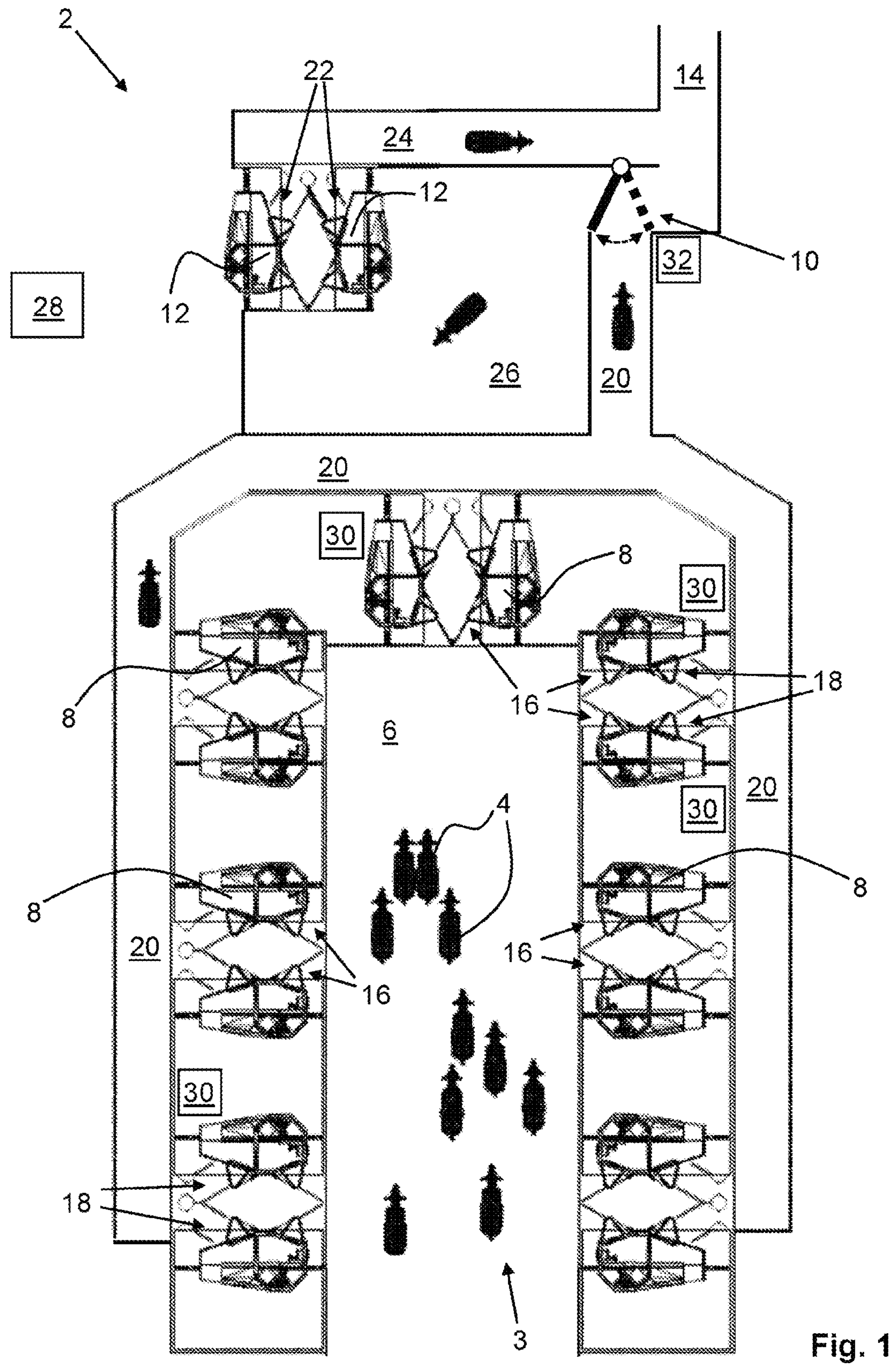
FIG. 1 illustrates a milking installation according to embodiments.

FIG. 1 illustrates a milking installation 2 according to embodiments.

The milking installation 2 is configured to milk a group 3 of animals 4. This may also be referred to as batchwise milking of animals 4. The group 3 of animals 4 is handled as one entity and as such e.g., presented for milking in the milking installation 2. As will be explained below with reference to FIG. 4, a number of groups of animals to be milked may be located in particular stall areas between milkings in the milking installation 2.

The milking installation 2 comprises an entrance area 6, a number of milking positions 8 configured to milk one animal 4 at a time, a selection gate 10, at least one milking stall 12, and an exit path 14.

The entrance area 6 is configured to receive therein one group 3 of animals 4 at a time. The entrance area 6 is configured to temporarily house a group 3 of animals 4 while the animals 4 of the group 3 enter the milking positions 8 as they are or become available.

The entrance area 6 forms an area wherein the animals 6 may freely move around. Also, due to the possibility to move freely within the entrance area 6, low ranked animals 4 within the group 3 stand a fair chance of finding an available milking position 8 without being hindered by higher ranked animals 4.

The group 3 of animals 4 may be manually or automatically driven or directed to the entrance area 6. The entrance area 6 may be an enclosed area with a dedicated entrance (not shown).

From the entrance area 6, the animals 4 have direct access to the milking positions 8 i.e., an animal 4, when leaving the entrance area 6, will immediately access one of the milking positions 8, if it is unoccupied.

In the illustrated embodiments the number of milking positions 8 is 14 but any suitable number of milking positions 8 may alternatively be provided, such as ≥4 milking positions. The number of milking positions 8 may be determined e.g., by one or more of the number of animals per group, the number of groups to be milked in the milking installation 2, a desired throughput of animals in the milking installation 2, available space at a farm facility, etc. Theoretically, the higher the number of milking positions 8, the higher the milking capacity of the milking installation 2.

The number of animals in a group is larger than the number of milking positions 8.

An entry 16 of each milking position 8 of the number of milking positions 8 is arranged with direct access from the entrance area 6. That is, the milking positions 8 adjoin the entrance area 6 for the individual animals 4 in the group 3 of animals 4 to access the milking positions 8. For instance, the milking positions 8 may be arranged along one or more sides of the entrance area 6.

The individual animals 4 in the group 3 of animals 4 that have entered one of the milking positions 8 cannot return from the milking position 8 into the entrance area 6. Instead, an animal 4 within one of the milking positions 8 has to leave the milking position 8 via an exit 18 of the relevant milking position 8.

The selection gate 10 is accessible from the exit 18 of each milking position 8.

Animals 4 of the group 3 of animals 4 cannot only be milked in the milking positions 8 but can alternatively be milked in the at least one milking stall 12. Specifically, the at least one milking stall 12 is provided in order to milk animal individuals 4, which require special handling and/or the milk of which requires special handling. See further below with reference to FIGS. 2*a* and 2*b*.

In the milking installation 2, each animal individual 4 of a group 3 of animals 4 in the entrance area 6 proceeds to be milked, either at one of the milking positions 8 or in the at least one milking stall 12.

In the illustrated embodiments the number of milking stalls 12 is two but a different number of milking stalls 12 may alternatively be provided, such as e.g. 1-4 milking stalls 12. Each milking stall 12 is configured to milk one animal 4 at a time.

The milking installation 2 may comprise one or more exit passages 20, which lead from the exit 18 of each milking position 8 to the selection gate 10.

One-way gates (not shown) may be arranged in the one or more exit passages 20 to guide animals 4 in the exit passage 20 towards the selection gate 10.

Selection gates as such are known. In the present milking installation 2, the selection gate 10 is configured to direct one animal individual 4 from the group 3 of animals 4 at a time either to the at least one milking stall 12 or to the exit path 14.

The selection gate 10 is schematically indicated in two positions. In a first position, shown with a full line, the selection gate 10 is positioned to direct an animal towards the exit path 14. That is, the first position of the gate 10 is selected for an animal 4 that has been milked in one of the milking positions 8. In a second position, shown with a broken line, the selection gate 10 is positioned to direct an animal 4 towards the at least one milking stall 12. That is, the position of the gate 10 is selected for an animal 4 that has not been milked in one of the milking positions 8 and which is to be milked in the at least one milking stall 12.

Accordingly, certain animal individuals 4 within the group 3 can pass one of the milking positions 8 without being milked therein and at the selection gate 10 be directed to the at least one milking stall 12 in order to be milked therein instead. Conversely, animal individuals 4 that have been milked in the milking positions 8 are at the selection gate 10 directed to the exit path 14. See also below with reference to FIGS. 2*a* and 2*b*.

An exit 22 of the at least one milking stall 12 may lead to the exit path 14. Accordingly, animals 4 leaving the at least one milking stall 12 may again join the group 3 of animals 4 when leaving the milking installation 2.

One or more passages 24 and one-way gates (not shown) may be arranged to guide animals 4 towards the exit path 14 from the exit 22 of the at least one milking stall 12.

The milking installation may comprise a diverting area 26 arranged between the selection gate 10 and the at least one milking stall 12. In this manner, if more animals 4 than available milking stalls 12 are directed towards the at least one milking stall 12, the animals 4 may wait in the diverting area 26 before entering a milking stall 12 when it becomes available.

The milking installation 2 comprises a control arrangement 28 (schematically indicated) configured to control the passage of animals 4 within the milking installation 2. At least, the control arrangement 28 is configured to control whether an animal individual 4 presenting itself in one of the milking positions 8 is to be milked therein or not and whether an animal individual 4 presenting itself at the selection gate 10 is directed towards the exit path 14 or the at least one milking stall 12.

For this purpose, the control arrangement 28 comprises animal identification devices 30, 32. As such, animal identification devices are known.

Accordingly, the milking installation 2 comprise an animal identification device 30 arranged at each milking position 8 (in FIG. 1 only shown at some of the milking positions 8). Further, the milking installation 2 comprises an animal identification device 32 arranged at the selection gate 10.

Also at the at least one milking stall 12, an animal identification device may be arranged (not shown).

Suitably, the control arrangement 28 has access to a database over animals 4 of the group 3 of animals 4. The database contains animal related data, in particular data related to whether a respective animal individual is to be milked at the milking positions 8 or in the at least one milking stall 12.

Thus, utilising the animal identification devices 30 arranged at the milking positions 8 and the identities of each animal individual 4 presenting itself at the milking positions 8, the control system 28 determines with reference to the database whether each particular animal individual 4 is to be milked in the milking position 8 or not.

Accordingly, the control arrangement 28 is configured, based on animal ID, either to retain within a first milking position 8 of the number of milking positions 8 an animal individual 4 having entered the first milking position 8 or to provide free passage through the first milking position 8 for the animal individual 4 to proceed to the selection gate 10. If the animal individual 4 is retained in the first milking position 8 it is milked therein. If instead free passage is provided through the first milking position 8, the animal individual 4 is not milked in the first milking position 8.

If milked at one of the milking positions 8, utilising the animal identification device 32 arranged at the selection gate 10 to identify the particular animal individual 4, the gate 10 is set in the first position (full line) and the particular animal individual 4 is directed to the exit path 14. If not milked in the milking position 8, utilising the animal identification device 32 arranged at the selection gate 10 to identify the particular animal individual 4, the gate 10 is set in the second position (broken line) and the particular animal individual 4 is directed to the at least one milking stall 12 to be milked therein.

Accordingly, the control arrangement 28 is configured, based on individual animal ID, to control the selection gate 10 to direct one or more animal individuals 4 from the group 3 of animals 4 either to the at least one milking stall 12 or to the exit path 14.

An example control arrangement 28 is further discussed below with reference to FIG. 3.

The exit path 14 may lead to a number of stall areas for groups of animals, as discussed below with reference to FIG. 4.

The milking installation 2 may be utilised for performing a method 100 as discussed below with reference to FIG. 5.

Figures 2A, 2B:
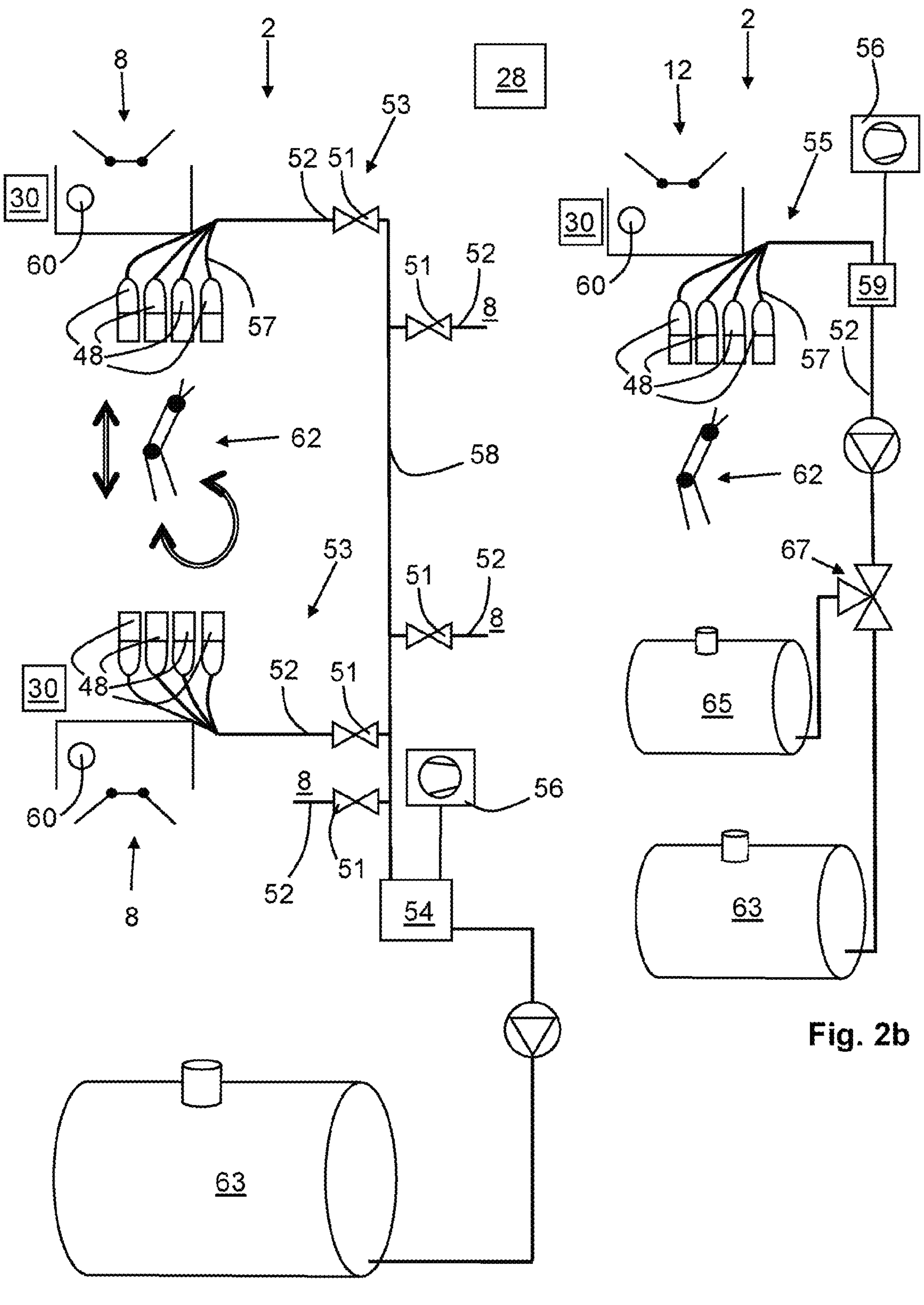
FIGS. 2*a* and 2*b* schematically illustrate inter alia milking equipment of a milking installation.

FIGS. 2*a* and 2*b* schematically illustrate inter alia milking equipment of a milking installation 2. The milking installation 2 may be a milking installation 2 as discussed herein with reference to FIGS. 1, 3, and 4. Accordingly, in the following reference is also made to FIGS. 1, 3, and 4.

FIG. 2*a* illustrates milking positions 8 of a number of milking positions 8 of the milking installation 2. FIG. 2*b* illustrates a milking stall 12 of the milking installation 2.

Each milking position 8 and the milking stall 12 comprises at least two teat cups 48 and at least one milk conduit 52 for conducting milk from the milking position 8 and the milking stall 12.

In the embodiments shown in FIGS. 2*a* and 2*b*, each milking position 8 and the milking stall 12 comprises four teat cups 48 and accordingly, may be configured to milk cows. Also, each milking position 8 comprises a valve device 51.

A common milk receiver 54 is connected to a common milk line 58 for the milking positions 8 of the milking installation 2. Milk milked in the milking positions 8 is conducted by means of gravity through the common milk line 58 to the common milk receiver 8.

Depending on how many milking positions 8 are provided in the milking installation 2, there may be provided one or more common milk receivers 54 connected to one or more common milk lines 58. Accordingly, if there is a large number of milking positions 8, milk milked in a first group of milking positions 8 may be transferred to a first common milk receiver 54 via a first common milk line 58 and milk from a second group of milking positions may be transferred via a second common milk line to a second common milk receiver (not shown).

The milking positions 8 are all of the same kind.

A local milk receiver 59 for temporary storage of milk milked from one animal individual only is provided at the milking stall 2, as shown in FIG. 2*b*.

Milking vacuum is produced by a vacuum system 56. The vacuum system 56 is connected to the common milk receiver 54 and to the local milk receiver 59.

Referring to FIG. 2*a*, from the common milk receiver 54, milking vacuum is provided at the teat cups 48 of the milking positions 8 connected to the common milk line 58, via the common milk line 58 and the at least one milk conduit 52 at the respective milking positions 8.

The valve device 51 at each milking position 8 is configured for closing the connection between the teat cups 48 and the common milk line 58. Such a valve device 51 may also be referred to as a shut off valve. The valve device 51 is open in connection with milking of an animal in a relevant milking position 8 and closed in between milkings of animals. Thus, air does not leak into the common milk line 58 when the teat cups 48 are not attached to the teats of an animal.

Milk in the common milk receiver 54 may be pumped from the common milk receiver 54 to a common milk tank 63.

The common milk tank 63 is configured to store milk for consumption.

Referring to FIG. 2*b*, from the local milk receiver 59, milking vacuum is provided at the teat cups 48 of the milking stall 12 via the at least one milk conduit 52 of the milking stall 12.

In a similar manner to the discussion above with reference to FIG. 2*a*, a valve device (not shown) may be provided to open and close the connection between the teat cups 48 and the local milk receiver 59.

Milk from animals milked in the milking stall 12 may be pumped from the local milk receiver 59 via a three-way valve 67 to either the common milk tank 63 or a tank 65 for separated milk.

Namely, the milk in the local milk receiver 59 may be sent to the common milk tank 63 e.g., if milk analysis verifies that the milk is suited for consumption. Alternatively, if the milk is deemed not suited for consumption, either based on milk analysis or on animal individual data stored in the database, it may be sent to the tank 65 for separated milk, or it may be disposed of in a different manner (not shown).

As an alternative to a three-way valve there may be provided a valve manifold capable to direct milk via a plurality of outlets to different containers and/or sources.

Each of the three-way valve 67 and the valve manifold may be controlled to direct milk to the common milk tank 63 or to the tank 65 for separated milk or to a different receiving container or to drain.

Such control may be performed by the control arrangement 28 based on animal identity as established by an animal identification device 30 arranged at the milking stall 12. Animal individual data stored in a database may be utilised by the control arrangement 28. Additionally, or alternatively, milk quality data established in real time during milking of an animal individual in the milking stall 12 may be utilised in the control of the three-way valve 67 and the valve manifold, respectively.

As discussed above, the milking positions 8 and the milking stall 12 are of different kinds. Animals and/or the milk milked from animals in the milking positions 8 are handled differently than animals and/or the milk milked from animals in the milking stall 12. For instance, milk from animal individuals in the milking positions 8 may be extracted and/or processed in accordance with a different scheme than the milk in the milking stall 12.

For instance, according to embodiments, each of the milking positions 8 comprises a first set of equipment 53 and the milking stall 12 comprises a second set of equipment 55. The first set of equipment 53 is different from the second set of equipment 55.

Thus, the different handling of animals in the milking positions 8 and/or the milk milked from animals in the milking positions 8 than the handling of animals and/or the milk milked from animals in the at least one milking stall 12 is achieved by the different first and second sets of equipment.

As discussed above, the milking installation 2 comprises a common milk receiver 54. At least two of the milking positions 8 provided milk milked therein to the common milk receiver 54. The first set of equipment 53 of each milking position 8 may be seen to comprise the teat cups 48 and the milk conduits 52. They are connected to the common milk receiver 54. The first set of equipment 53 is configured to, during milking of one animal individual, conduct milk from the one animal individual via the milk conduits 52 to the common milk receiver 54.

The second set of equipment 55 of the milking stall 12 may be seen to comprise the teat cups 48, the milk conduit 52, and the local milk receiver 59 for temporary storage of milk milked from one animal individual only.

Extracted milk from animals in one the milking positions 8 may be processed in accordance with a scheme wherein the milk is being conducted via the common milk line 58 directly to the common receiver 54 during milking. Extracted milk from an animal individual in the milking stall 12 may be processed in accordance with a scheme wherein the milk is collected in the local milk receiver 59 before being conducted from the milking stall 12.

The second set of equipment 55 may be configured to process extracted milk according to a special scheme different from a standard scheme applied by the first set of equipment 53.

For example, the special scheme applied by the second set of equipment 55 may involve taking a milk sample and analysing the same. Alternatively, or additionally, the special scheme may involve forwarding the extracted milk to a storage tank 65 being physically separated from the common milk tank 63. Consequently, the second set of equipment 55 may be employed for milking animals whose milk must be separated from milk of other animals e.g., due to medical conditions.

Thus, the second set of equipment 55 may further comprise one or more milk sensors for analysing extracted milk.

Within the group of animals there are animal individuals, for which it is known that they produce milk for consumption. These animal individuals are milked at the milking positions 8.

Other animal individuals within the group are milked in the milking stall 12.

Mentioned purely as examples, animal individuals may be milked in the milking stall 12 for one or more of the following reasons: the animal individual is treated with medicaments, the animal individual is producing colostrum, milk samples are to be drawn from the animal individual, the animal individual is under observation and it has to be decided based on real time animal data or milk data whether its milk is suited for consumption, the animal is to be subjected to treatment, etc.

The second set of equipment 55 may comprise instruments, equipment, and or devices for one or more of taking milk samples, analysing milk samples, taking blood samples, analysing blood samples, analysing animal breath, treating animals, etc.

As mentioned initially, according to some embodiments, the first set of equipment 53 of the milking positions 8 may comprise a local milk receiver. In such embodiments, the vacuum system 56 is connected to the milk receivers of the milking positions 8.

Suitably, the database contains relevant animal individual data for the control arrangement 28 to initiate milk sampling, milk analysis, blood sampling, blood analysis, breath analysis, animal treatment, etc.

The milking installation 2 comprises at least one robot arm 62 configured to attach the teat cups 48 to the teats of animals presenting themself for milking in one of the milking positions 8 and/or in the milking stall 12. The at least one robot arm 62 may be associated with at least one milking position 8 and/or the milking stall 12.

Accordingly, the milking installation 2 may comprise one individual robot arm 62 for at least some of the milking positions 8, the robot arm 62 being configured to attach the teat cups 48 of the relevant milking position 8 to the teats of animals. Alternatively, or additionally, the milking installation 2 may comprise a robot arm 62 configured to attach the teat cups 48 to animals in more than one milking position 8. Such a robot arm 62 may be configured to rotate and/or travel laterally in order to reach the different milking positions 8 to be served by the robot arm 62, as indicated by the arrows at the robot arm 62 in FIG. 2*a*.

Similarly, the milking installation 2 may comprise one individual robot arm 62 for at least one milking stall 12, the robot arm 62 being configured to attach the teat cups 48 of the relevant milking stall 12 to the teats of animals. Alternatively, or additionally, the milking installation 2 may comprise a robot arm 62 configured to attach the teat cups 48 to animals in more than one milking stall 12.

Figure 3:
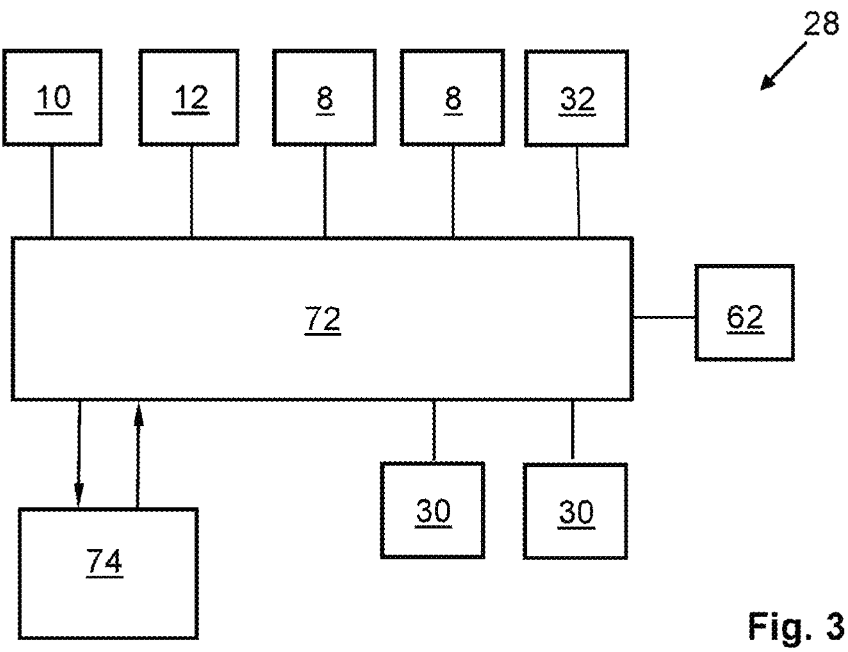
FIG. 3 illustrates a control arrangement for controlling a milking installation.

FIG. 3 illustrates a control arrangement 28 for controlling a milking installation. The milking installation may be a milking installation 2 as discussed above with reference to FIGS. 1-2*b* and below with reference to FIG. 4. Accordingly, in the following reference is also made to FIGS. 1-2*b*, and 4.

The control arrangement 28 comprises a calculation unit 72 which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression calculation unit 72 may represent a processing circuitry comprising a plurality of processing circuits, such as, e.g., any, some or all of the ones mentioned above.

The control arrangement 28 may comprise a memory unit 74. The calculation unit 72 is connected to the memory unit 74, which provides the calculation unit 72 with, for example, stored programme code and/or stored data which the calculation unit 72 needs to enable it to do calculations. The calculation unit 72 may also be adapted to storing partial or final results of calculations in the memory unit 74.

A database over animals of a farm, such as animals of groups of animals to be milked in the milking installation 2 may be stored in the memory unit 74. The database may include animal related data on animal individual basis. The animal individual data may be updated by a farmer and/or by data established in the milking installation 2, such as data established by analysing milk samples, analysing blood samples, analysing animal breath, etc.

The memory unit 74 may comprise a physical device utilised to store data or programs i.e., sequences of instructions, on a temporary or permanent basis.

The calculation unit 72 is connected to various parts and/or components of the milking installation 2 to control their operation e.g., for controlling milking operations, for measuring and/or determining milking parameters and/or milk parameters, etc. Exemplified in FIG. 4 are connections of the calculation unit 72 with the milking positions 8, the at least one milking stall 12, the selection gate 10, a robot arm 62, and animal identification devices 30, 32.

The control arrangement 28 may comprise more than one calculation unit 72 and more than one memory unit 74. For instance, the control arrangement 28 may be a distributed control arrangement with two or more separate calculation units, each configured for one or more particular tasks within the milking installation 2, such as controlling the selection gate 10, opening and closing of entrance and exit gates of the milking positions 8, controlling milking operations, operating a robot arm 62, etc.

The control arrangement 28 may be configured to perform a method 100 according to any one of aspects and/or embodiments discussed herein, see e.g. below with reference to FIG. 5.

Figure 4:
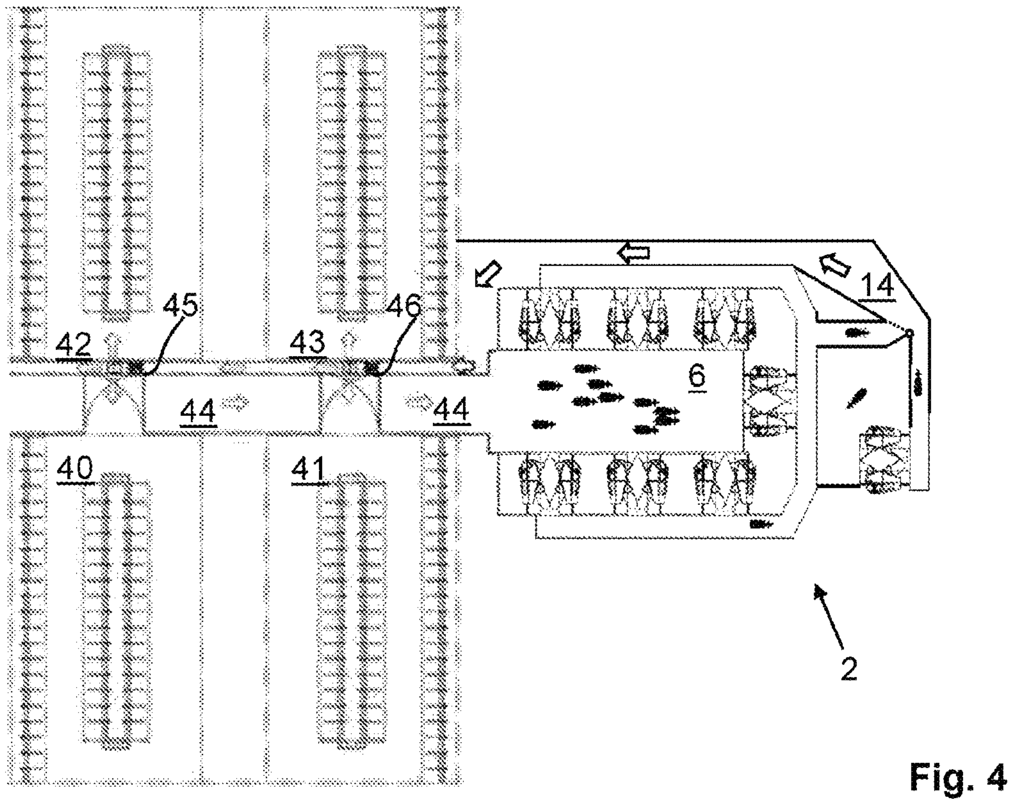
FIG. 4 illustrates stall areas connected to a milking installation according to embodiments.

FIG. 4 illustrates an example of first, second, third and fourth stall areas 40, 41, 42, 43 connected to a milking installation 2 according to embodiments. The milking installation 2 may be a milking installation as discussed above with reference to FIGS. 1-3.

Each of the first to fourth stall areas 40, 41, 42, 43 houses one group of animals. Each group of animals is milked in the milking installation 2, one group at a time.

A passageway 44 connects the stall areas 40, 41, 42, 43 such that each group of animals is allowed to pass from each of the stall areas 40, 41, 42, 43 to the entrance area 6. A number of manually or automatically controlled gates are arranged in the passageway 44 to direct one group of animals at a time towards the entrance area 6.

Also, the exit path 14 from the milking installation 2 may be connected to the stall areas 40, 41, 42, 43, such that after completed milking, the individual animals of a group of animals can move back to the dedicated stall area 40, 41, 42, 43 of the relevant group of animals.

Specifically, to facilitate the return passage of animal individuals, one or more automatic gates 46, 45 may be arranged in the passageway 44. At the automatic gates 46, 45 returning animal individuals are identified in order to be directed via the automatic gates 46, 45 to their respective dedicated stall area 40, 41, 42, 43.

Figure 5:
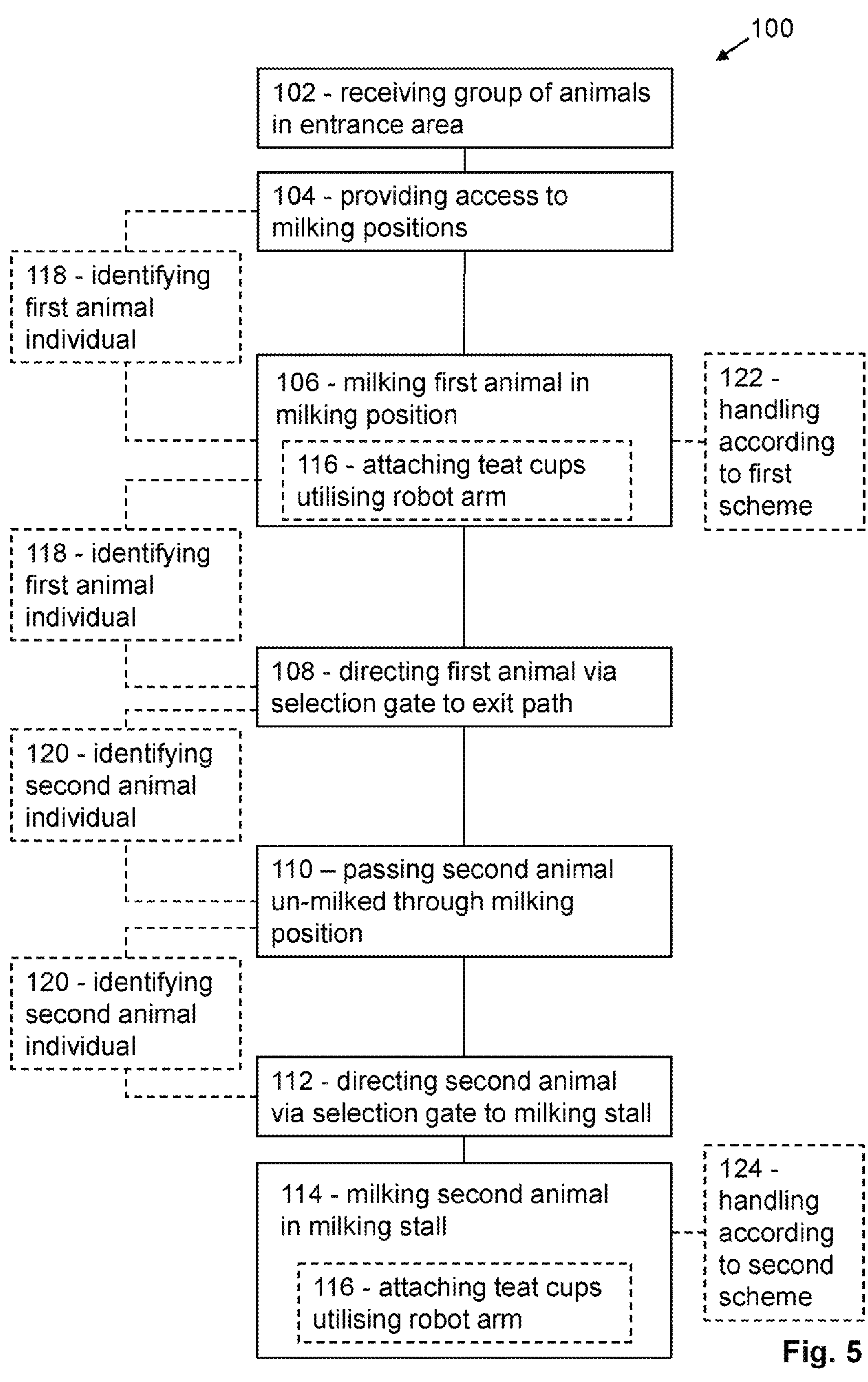
FIG. 5 illustrates embodiments of a method for milking of a group of animals in a number of milking positions.

FIG. 5 illustrates embodiments of a method 100 for milking of a group of animals in a number of milking positions. The method 100 may be performed in a milking installation 2 as discussed herein, inter alia with reference to FIGS. 1-4. Moreover, the method 100 may be performed utilising a control arrangement 28, as discussed with reference to FIG. 3. Accordingly, in the following, reference will also be made to FIGS. 1-4.

The method 100 may be provided in the form of a computer program comprising instructions which, when the program is executed by a computer, causes the computer to carry out the method 100. The computer may comprise a calculation unit 72, as discussed above with reference to FIG. 3. The computer program may be stored on a computer-readable storage medium.

The method 100 comprises steps of:

receiving 102 the group 3 of animals 4 in an entrance area 6, providing 104 access to a number of milking positions 8 directly from the entrance area 6, milking 106 a first animal individual 4 of the group 3 of animals 4 in one milking position 8 of the number of milking positions 8, directing 108 the first animal individual 4 via a selection gate 10 to an exit path 14 from the milking installation 2, passing 110 a second animal individual 4 un-milked through one milking position 8 of the number of milking positions 8, directing 112 the second animal individual 4 via the selection gate 10 to at least one milking stall 12, and milking 114 the second animal individual 4 in the at least one milking stall 12.

According to embodiments, at least one of the steps of milking 106 a first animal individual 4 of the group 3 of animals 4 in one milking position 8 of the number of milking positions 8 and milking 114 the second animal 4 in the at least one milking stall 12 may comprise a step of:

attaching 116 teat cups 48 to the teats of the first and/or second animal individual 4 utilising at least one robot arm 62.

In this manner, at least part of the milking installation 2 may be automated.

According to embodiments, each of the steps of milking 106 a first animal individual 4 of the group 3 of animals 4 in one milking position 8 of the number of milking positions 8 and directing 108 the first animal individual 4 via a selection gate 10 to an exit path 14 from the milking installation 2 may be preceded by a step of:

identifying 118 the first animal individual 4, and wherein each of the steps of passing 110 a second animal individual 4 un-milked through one milking position 8 of the number of milking positions 8 and directing 112 the second animal individual 4 via the selection gate 10 to at least one milking stall 12 may be preceded by a step of:

identifying 120 the second animal individual 4.

In this manner, the method 100 may be adapted, based on animal identity, to milk an animal individual 4 either in one of the milking positions or in the at least one milking stall 12. Accordingly, it is ensured that each animal 4 of a group 3 of animals 4 may be milked in accordance with the method 100 in the milking installation 2.

According to embodiments, each of the milking positions 8 may comprise a first set of equipment 53 and the at least one milking stall 12 may comprise a second set of equipment 55. The method 100 may comprise steps of:

handling 122 a first animal 4 and/or milk form the first animal 4 in one of the milking positions 8 according to a first scheme utilising the first set of equipment 53, and handling 124 a second animal 4 and/or milk form the second animal 4 in the at least one milking stall 12 according to a second scheme utilising the second set of equipment 55, wherein the first scheme is different from the second scheme.

In this manner, each animal individual 4 within the group 3 may be handled and/or its milk may be handled in accordance with a scheme appropriate for the respective animal individual 4.

The first scheme performed at each of the milking positions 8 may be basically the same. The second scheme performed in the at least one milking stall 12 may be in accordance with one or more variations of the second scheme. Accordingly, in the milking positions 8, a first scheme suitable for handling most animals 4 of the group 3 and/or the milk of most animals 4 of the group 3 may be performed. In the at least one milking stall 12, the second scheme in accordance with one of its variations may be performed to handle those animals 4 of the group 3 and/or their milk that are not suited for handling according to the first scheme.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A milking installation (2) configured to milk a group (3) of animals (4), the milking installation (2) comprising:

an entrance area (6);

a number of milking positions (8) configured to milk one of the animals (4) at a time;

an animal identification device (30) arranged at each of the milking positions, each of the animal identification devices being configured to generate an animal ID associated with a particular individual of the group of animals present at the animal identification device;

a selection gate (10);

another said animal identification device (32) arranged at the selection gate (10);

at least one milking stall (12);

a control arrangement (28); and an exit path (14), wherein the entrance area (6) is configured to receive therein the group (3) of animals (4), wherein an entry of each said milking position (8) of the number of milking positions (8) is arranged with direct access from the entrance area (6), wherein the selection gate (10) is accessible from an exit of each of the milking positions (8), wherein the selection gate (10) is configured to direct one or more individual animals (4) from the group (3) of animals (4) either to the at least one milking stall (12) or to the exit path (14), wherein the control arrangement (28) is configured, based on the animal ID, to determine whether to retain within a first milking position (8) of the number of milking positions (8) an animal individual (4) having entered the first milking position (8) so that the animal individual will be milked, or to provide free passage through the first milking position (8) for the animal individual (4) to proceed to the selection gate (10) without being milked, and wherein the control arrangement (28) is further configured, based on said individual animal ID, to control the selection gate (10) to direct one or more of the animal individuals (4) from the group (3) of animals (4) either to the at least one milking stall (12) or to the exit path (14).

2. The milking installation (2) according to claim 1, comprising a diverting area (26) arranged between the selection gate (10) and the at least one milking stall (12).

3. The milking installation (2) according to claim 1, comprising at least one robot arm (62) configured to attach teat cups (48) to the teats of an animal (4), wherein the at least one robot arm (62) is associated with at least one said milking position (8) of the number of milking positions (8) and/or associated with the at least one milking stall (12).

4. The milking installation (2) according to claim 1, wherein the entrance area (6) is configured for the group (3) of animals (4) to move freely therein.

5. The milking installation (2) according to claim 1, wherein each of the milking positions (8) comprises a first set of equipment (53) and the at least one milking stall (12) comprises a second set of equipment (55), and wherein the first set of equipment (53) is different from the second set of equipment (55).

6. The milking installation (2) according to claim 5, comprising a common milk receiver (54) for milk milked in at least two of the milking positions (8), wherein the first set of equipment (53) comprises first teat cups (48) and milk conduits (52) and is connected to the common milk receiver (54), wherein the first set of equipment (53) is configured to, during milking of one animal individual (4), conduct milk from the one animal individual (4) via the milk conduits (52) to the common milk receiver (54), and wherein the second set of equipment (55) comprises second teat cups (48), second milk conduits (52) and a local milk receiver (59) for temporary storage of milk milked from one animal individual (4) only.

7. A method (100) for milking of a group (3) of animals (4) in a milking installation (2), the method (100) comprising:

receiving (102) the group (3) of animals (4) in an entrance area (6), providing (104) access to a number of milking positions (8) directly from the entrance area (6), milking (106) a first animal individual (4) of the group (3) of animals (4) in one said milking position (8) of the number of milking positions (8), directing (108) the first animal individual (4) via a selection gate (10) to an exit path (14) from the milking installation (2), passing (110) a second animal individual (4) un-milked through one said milking position (8) of the number of milking positions (8), directing (112) the second animal individual (4) via the selection gate (10) to at least one milking stall (12), and milking (114) the second animal individual (4) in the at least one milking stall (12).

8. The method (100) according to claim 7, wherein at least one of the steps of milking (106) the first animal individual (4) of the group (3) of animals (4) in one said milking position (8) of the number of milking positions (8) and milking (114) the second animal individual (4) in the at least one milking stall (12) comprises a step of:

attaching (116) teat cups (48) to the teats of the first and/or the second animal individual (4) utilising at least one robot arm (62).

9. The method (100) according to claim 7, wherein each of the steps of milking (106) the first animal individual (4) of the group (3) of animals (4) in one said milking position (8) of the number of milking positions (8) and directing (108) the first animal individual (4) via the selection gate (10) to the exit path (14) from the milking installation (2) is preceded by a step of:

identifying (118) the first animal individual (4), and wherein each of the steps of passing (110) the second animal individual (4) un-milked through one said milking position (8) of the number of milking positions (8) and directing (112) the second animal individual (4) via the selection gate (10) to at least one milking stall (12) is preceded by a step of:

identifying (120) the second animal individual (4).

10. The method (100) according to claim 7, wherein each of the milking positions (8) comprises a first set of equipment (53) and the at least one milking stall (12) comprises a second set of equipment (55), and wherein the method (100) comprises steps of:

handling (122) a first animal (4) and/or milk form the first animal (4) in one of the milking positions (8) according to a first scheme utilising the first set of equipment (53), and handling (124) a second animal (4) and/or milk form the second animal (4) in the at least one milking stall (12) according to a second scheme utilising the second set of equipment (55), wherein the first scheme is different from the second scheme.

11. A milking installation (2) configured to selectively milk animals within a group (3) of said animals (4), the milking installation (2) comprising:

an entrance area (6);

a plurality of milking positions (8), each configured to milk one of the animals at a time, each of the milking positions comprising:

an animal identification device;

a milking position entry with direct access to the entrance area;

a first set of milking equipment;

a milking position exit;

a common milk line configured to carry milk from the first set of milking equipment of each of the milking positions; and an exit passage open to the milking position exit of each of the milking positions;

a selection gate comprising an animal identification device, the selection gate being positioned with respect to the exit passage such that each of the animals in the exit passage must pass through the selection gate to leave the exit area, the selection gate being constructed to selectively allow passage of a given one of the animals present at the selection gate through either a first selection gate exit or a second selection gate exit;

an exit path connected directly to the first selection gate exit, by which a given one of the animals can exit the milking installation;

a milking stall connected to the second selection gate exit, the milking stall comprising:

a second set of milking equipment;

a milk conduit configured to carry milk from the second set of milking equipment; and a milking stall exit open to the exit passage; and a control arrangement connected to each of the animal identification devices, each of the milking positions, and the selection gate, the control arrangement being configured to control movement and milking of the animals within the milking installation by:

receiving animal identity data from each of the animal identification devices in the milking positions and the selection gate, based on the animal identity data received from a given said milking position, determine whether the animal at the given milking position is to be retained in the given milking position for milking or passed through without milking, and controlling whether the selection gate directs a given said animal present at the selection gate to the milking stall or the exit path;

wherein the milking installation is configured so that the control arrangement determines whether the milk from a given said animal passes to the common milk line or the milk conduit.

12. The milking installation of claim 11, further comprising:

a common milk tank connected to the common milk line; and a three-way valve connected to the control arrangement, the three-way valve comprising:

an input connected to the milk conduit;

a first output connected to the common milk tank; and a second output;

wherein the control arrangement controls the three-way valve to determine whether milk received from a given said animal in the milking stall is passed to the common milk tank to mix with milk received from the milking positions or kept separate from the milk received from the milking positions.

13. The milking installation of claim 12, wherein the control arrangement controls the three-way valve based on the animal identity data.

14. The milking installation of claim 13, wherein the milking stall further comprises a said animal identification device, and wherein the animal identification data used by the control arrangement to control the three-way valve is received from the animal identification device in the milking stall.

15. The milking installation of claim 13, wherein the control arrangement controls the three-way valve based on milk quality data established in real time during milking of a given said animal in the milking stall.

* * * * *